(12) United States Patent
Krone et al.

(10) Patent No.: US 7,089,475 B1
(45) Date of Patent: Aug. 8, 2006

(54) ERROR CORRECTION OF DATA ACROSS AN ISOLATION BARRIER

(75) Inventors: Andrew W. Krone, Austin, TX (US); Mitchell Reid, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 446 days.

(21) Appl. No.: 10/400,182

(22) Filed: Mar. 26, 2003

(51) Int. Cl.
*G06F 11/00* (2006.01)
*H04B 1/38* (2006.01)

(52) U.S. Cl. ...................... 714/746; 375/220

(58) Field of Classification Search ................ 714/746; 375/222, 257; 379/73.05; 365/232
See application file for complete search history.

(56) References Cited

U.S. PATENT DOCUMENTS

| | | | |
|---|---|---|---|
| 4,475,208 A | 10/1984 | Ricketts | |
| 4,541,104 A | 9/1985 | Hirosaki | |
| 4,620,300 A | 10/1986 | Ogawa | |
| 5,051,799 A | 9/1991 | Paul et al. | |
| 5,136,587 A | 8/1992 | Obana et al. | |
| 5,506,903 A | 4/1996 | Yamashita | |
| 5,561,712 A | 10/1996 | Nishihara | |
| 5,654,984 A | 8/1997 | Hershbarger et al. | |
| 5,705,978 A | 1/1998 | Frick et al. | |
| 5,740,241 A | 4/1998 | Koenig et al. | |
| 5,867,489 A | 2/1999 | Hershey et al. | |
| 5,870,046 A | 2/1999 | Scott et al. | |
| 6,072,778 A | 6/2000 | Labedz et al. | |
| 6,137,827 A | 10/2000 | Scott et al. | |
| 6,144,326 A | 11/2000 | Krone et al. | |
| 6,160,885 A | 12/2000 | Scott et al. | |
| 6,167,134 A | 12/2000 | Scott et al. | |
| 6,198,816 B1 | 3/2001 | Hein et al. | |
| 6,298,133 B1 | 10/2001 | Hein et al. | |
| 6,351,530 B1* | 2/2002 | Rahamim et al. | 379/399.01 |
| 6,359,983 B1 | 3/2002 | Krone et al. | |
| 6,385,235 B1 | 5/2002 | Scott et al. | |
| 6,389,134 B1 | 5/2002 | Dupuis et al. | |
| 6,408,034 B1 | 6/2002 | Krone et al. | |
| 6,430,229 B1 | 8/2002 | Scott et al. | |
| 6,480,602 B1 | 11/2002 | Dupuis et al. | |
| 2003/0179818 A1* | 9/2003 | D'Angelo et al. | 375/222 |
| 2004/0100854 A1* | 5/2004 | Rahamim et al. | 365/232 |

OTHER PUBLICATIONS

Silicon Laboratories Data Sheet Si3034, "3.3 V Global Direct Access Arrangement," Rev. 2.01 Sep. 2001, Si3034-DS201, pp. 1-66.

* cited by examiner

*Primary Examiner*—Phung My Chung
(74) *Attorney, Agent, or Firm*—O'Keefe, Egan & Peterman, LLP

(57) ABSTRACT

A communication isolation system is provided that may employ error correction techniques for the data communicated across an isolation barrier used for connecting electronic circuitry to a communication line. In one embodiment, each data bit to be transmitted to or from the phone line may be transmitted three times across an isolation barrier so that it is possible to withstand a single electronic fast transient event. In another embodiment, the isolation barrier may be a capacitive isolation barrier. In another embodiment, the three transmissions of the data bit may be received across the isolation barrier and delay elements utilized to provide the data bits to a logic circuit in a synchronized fashion so that the three data bits may be compared to determine the error corrected data.

24 Claims, 3 Drawing Sheets

ERROR CORRECTION OF DATA ACROSS AN ISOLATION BARRIER

TECHNICAL FIELD OF THE INVENTION

This invention relates to the fields of phone line termination circuits and isolation systems for use in selectively isolating electrical circuits from one another. More particularly, this invention relates to isolation systems having error correction of the data transmitted across isolation barriers utilized in phone line termination circuits.

BACKGROUND

Electrical isolation barriers can be identified in many industrial, medical and communication applications where it is necessary to electrically isolate one section of electronic circuitry from another electronic section. In this context isolation exists between two sections of electronic circuitry if a large magnitude voltage source, typically on the order of one thousand volts or more, connected between any two circuit nodes separated by the barrier causes less than a minimal amount of current flow, typically on the order of ten milliamperes or less, through the voltage source. An electrical isolation barrier must exist, for example, in communication circuitry which connects directly to the standard two-wire public switched telephone network and that is powered through a standard residential wall outlet. Specifically, in order to achieve regulatory compliance with Federal Communications Commission Part 68, which governs electrical connections to the telephone network in order to prevent network harm, an isolation barrier capable of withstanding 1000 volts rms at 60 Hz with no more than 10 milliamps current flow, must exist between circuitry directly connected to the two wire telephone network and circuitry directly connected to the residential wall outlet.

In one particular example, Direct Access Arrangement (DAA) circuitry may be used to terminate the telephone connections at a phone line user's end to provide a communication path for signals to and from the phone lines. DAA circuitry includes the necessary circuitry to terminate the telephone connections at the user's end and may include, for example, an isolation barrier, DC termination circuitry, AC termination circuitry, ring detection circuitry, and processing circuitry that provides a communication path for signals to and from the phone lines. It is also desirable that the DAA circuitry act as an isolation barrier to meet the requirements of FCC regulations, Part 68. Examples of DAA circuitry known in the art may be found described in U.S. Pat. No. 6,198,816, U.S. Pat. No. 6,298,133, and U.S. Pat. No. 6,385,235, the disclosure of each being incorporated herein by reference. The DAA circuitry may utilize capacitors, transformers, opto-couplers, or a combination thereof for the isolation elements that provide the necessary phone line isolation.

In applications such as DAA circuitry there exists an analog or continuous time varying signal on one side of the isolation barrier, and the information contained in that signal must be communicated across the isolation barrier. For example, common telephone network modulator/demodulator, or modem, circuitry powered by a residential wall outlet must typically transfer an analog signal with bandwidth of approximately 4 kilohertz across an isolation barrier for transmission over the two-wire, public switched telephone network. It is usually desirable that the isolation method and associated circuitry provide this communication reliably and inexpensively. In this context, to achieve reliable transfer of information across the isolation barrier it is typically desirable that the following conditions apply: the isolating elements themselves do not significantly distort the signal information, the communication is substantially insensitive to or undisturbed by voltage signals and impedances that exist between the isolated circuitry sections and, finally, the communication is substantially insensitive to or undisturbed by noise sources in physical proximity to the isolating elements.

For example, single bit errors may result when common mode transients, also called electronic fast transients (EFTs), are present during transmission of information across the isolation elements of the isolation barrier. Typically, the information bits transmitted across the isolation barrier may include data bits, control bits and framing bits as discussed in U.S. Pat. No. 6,408,038 that describes a system for transmitting information across a capacitive barrier, the disclosure of which is incorporated herein by reference. Bits errors involving control bits may often be most troublesome as improperly interpreted control signals may change major system functions such as, for example, setting the system in the off-hook or on-hook state. One technique for alleviating the effects of EFTs is to transmit every control bit multiple times over a period of time. Thus, in one prior art example a control bit must be the same four times in a row before it takes effect. Since a control bit may be sent roughly every 64 usec., a single EFT (which is on the order of about 1 usec.) cannot corrupt more than one instance of the control bit.

Data bits may be provided at significantly higher rates, such as for example, 488 nsec/bit. Thus, a single EFT event can impact multiple data bits. Though individual data bits may not be as critical as control bits for system operations, the throughput of a modem may be reduced due to data bit errors. For example, EFTs during a modem connection may result in decreased modem throughput.

Thus, it would be desirable to implement a DAA circuit that has a cost effective and efficient solution to EFTs and other error sources that may impact data bits.

SUMMARY OF THE INVENTION

Disclosed herein is a communication isolation system that may employ error correction techniques for the data communicated across an isolation barrier used for connecting electronic circuitry to a communication line, such as for example, a phone line. In one embodiment, each data bit to be transmitted to or from the phone line may be transmitted three times across an isolation barrier so that it is possible to withstand a single electronic fast transient event. In one exemplary form of the invention, the isolation barrier may be a capacitive isolation barrier. In an exemplary form of the invention, the three transmissions of the data bit may be received across the isolation barrier and delay elements utilized to provide the data bits to a logic circuit in a synchronized fashion so that the three data bits may be compared to determine the error corrected data.

In an exemplary form of the invention data bits may be transmitted in data groups such as $D_{N-2A}$, $D_{N-A}$, and $D_N$ data bits, wherein $D_N$ is a current data bit and $D_{N-2A}$ and $D_{N-A}$ are the data bits transmitted 2A and A bits previously respectively. The next data group may be comprised of $D_{(N+1)-2A}$, $D_{(N+1)-A}$, and $D_{N+1}$ data bits. This pattern may continue indefinitely such that each data bit will be eventually transmitted three times. On the reception side of the isolation barrier, delay blocks, for example shift registers, may be utilized having delays of A delay units and 2A delay units.

These delay blocks may be arranged to selectively receive the data such that the three transmissions of a given data bit may be provided to an error correction logic circuit at the same time. The error correction logic circuit may then determine the error corrected data bit output by selecting the output to be the value equal to two or more of the input values. In this manner, even if one of the three transmissions of a given data bit is corrupted (such as from an EFT), the output of the error correction logic will be the correct data bit value.

DESCRIPTION OF THE DRAWINGS

So that the manner in which the herein described advantages and features of the present invention, as well as others which will become apparent, are attained and can be understood in detail, a more particular description of the invention summarized above may be had by reference to the embodiments thereof which are illustrated in the appended drawings, which drawings form a part of this specification.

It is noted, however, that the appended drawings illustrate only exemplary embodiments of the invention and are therefore not to be considered limiting of its scope, for the invention may admit to other equally effective embodiments.

DESCRIPTION OF ILLUSTRATIVE EMBODIMENTS

Figure 1:
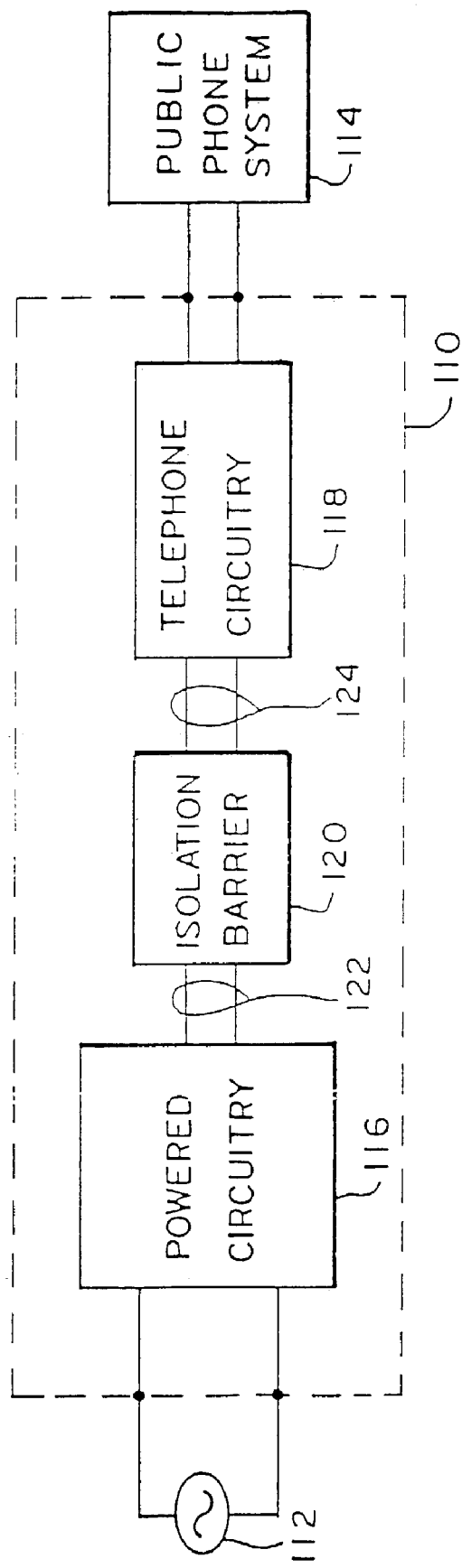
FIG. 1 is a block diagram of a telephone line connection circuitry according to one embodiment of the disclosed systems and methods.

In order to provide a context for understanding this description, FIG. 1 illustrates a typical application for the present invention: circuitry that includes circuitry powered by a source external to the phone system. DAA circuitry 110 for coupling to a phone line may be used with or incorporated within devices including, but not limited to, radio (cordless), modem, speakerphone, and answering machine devices that may require an external source of power 112, typically obtained by plugging the phone (or a power supply transformer/rectifier) into a typical 110-volt residential wall outlet. A basic telephone line side circuit 118 is connected to the public telephone system and does not have a separate power connection. In order to protect public phone system 114 (and to comply with governmental regulations), it is necessary to isolate "powered circuitry" 116 that is externally powered from "isolated circuitry" 118 (isolated circuitry may also be called telephone line side circuit) that is connected to the phone lines, to prevent dangerous or destructive voltage or current levels from entering the phone system (similar considerations exist in many other applications as well, including communication, medical and instrumentation applications in which this invention may be beneficially applied). The required isolation is provided by isolation barrier 120. The signal that passes through the isolation barrier 120 may be a digital or analog signal. In some applications, communication across isolation barrier 120 may be unidirectional (in either direction), but in many applications, including telephony, bi-directional communication is required. Bi-directional communication may be provided using a pair of unidirectional isolator channels, or by forming a single isolation channel and multiplexing bi-directional signals through the channel. The primary requirements placed on isolation barrier 120 are that it effectively prevents harmful levels of electrical power from passing across it, while accurately passing the desired signal from the powered side 122 to the isolated side 124, or in the reverse direction if desired.

Figure 2:
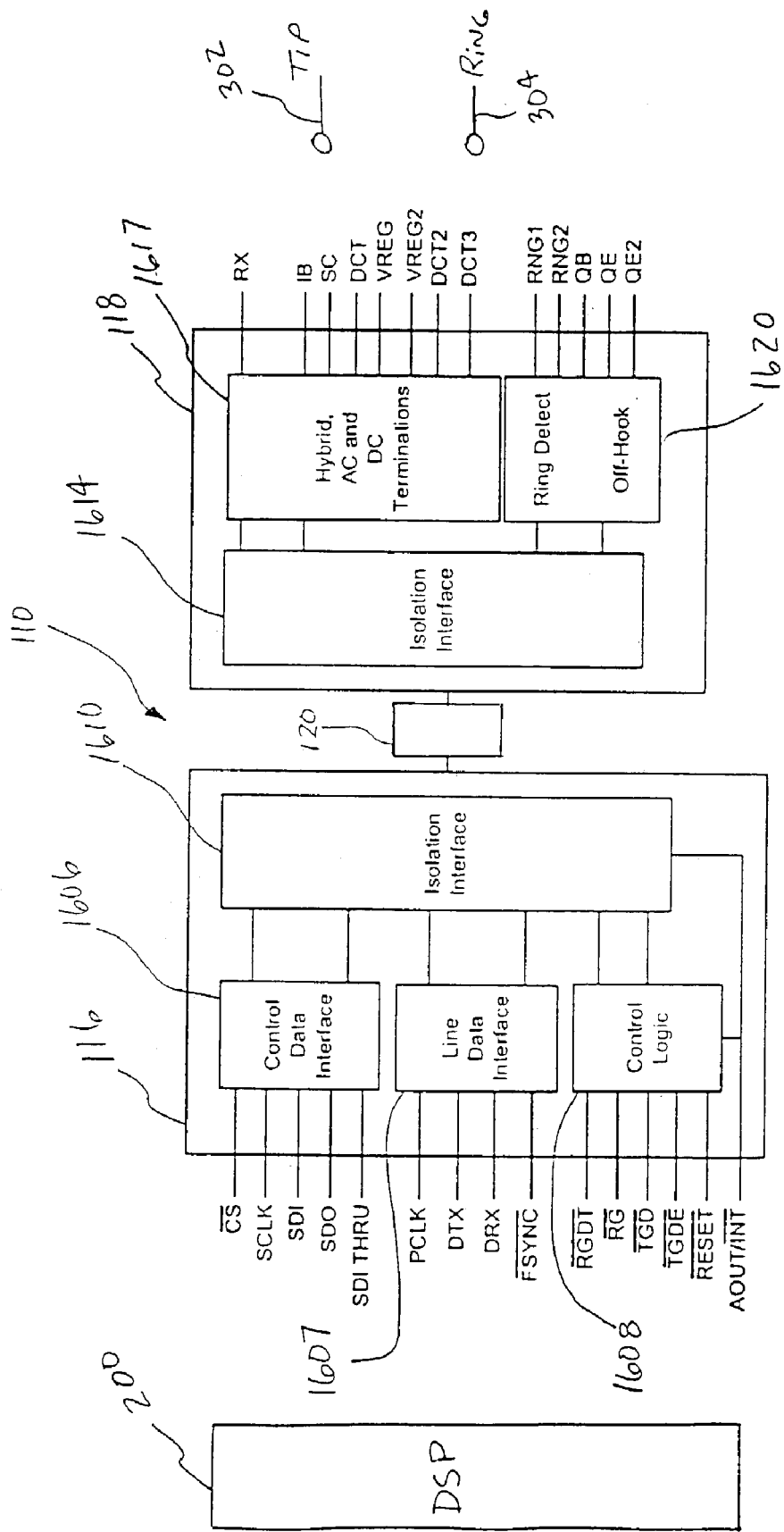
FIG. 2 is a general block diagram of digital DAA circuitry including phone line side circuitry, an isolation barrier, and powered side circuitry according to one embodiment of the disclosed systems and methods.

FIG. 2 is a general block diagram of digital DAA circuitry 110 including telephone line side circuit 118, an isolation barrier 120, and powered side circuitry 116 according to the present invention. The isolation barrier 120 may include any device or combination of devices suitable for providing the required isolation, and also allowing for the transmission of digital information between the isolation interface 1614 in the phone line side circuitry and the isolation interface 1610 in the powered side circuitry. In this regard, isolation barrier 120 may include, for example, one or more capacitors, one or more transformers, opto-isolators, combinations thereof, etc. The telephone line side circuit 118 may be connected to phone lines of a telephone network system (e.g., public telephone system, PBX network, etc.), and the powered side circuitry 116 may be connected to external controllers (e.g., including, but not limited to, digital signal processor (DSP) 200) that may be part of a communication device, such as a phone or modem.

The powered side circuitry 116, which may be implemented as an integrated circuit (IC), may communicate with the external controller through a control data interface 1606, a line data interface 1607 and control logic 1608. In addition, the control data interface 1606, line data interface 1607 and the control logic 1608 are connected to the isolation interface 1610 so that control, status, signal and other desired information may be transmitted to and received from the telephone line side circuit 118 across the isolation barrier 120.

In the embodiment depicted, the control data interface 1606 and line data interface 1607 may have a number of external pins providing a serial port interface to the external controller, such as serial port data input pin (SDI) for providing serial port control data input, serial port data output pin (SDO) for providing serial port control data output, serial port bit clock input pin (SCLK) for controlling the serial data on SDO and for latching the data on SDI, chip select input pin (CS_bar) (it is noted that the suffix "_bar" is used to denote a signal that is typically asserted when at a low logic level) for providing an active low input control signal that enables the SPI Serial port (when inactive, SCLK and SDI are ignored and SDO is high impedance), SDI passthrough output pin (SDITHRU) for providing cascaded SDI output signal to daisy-chain the SPI interface with additional devices, master clock input pin (PCLK) for providing a master clock input, transmit PCM or GCI highway data output pin (DTX) for outputting data from either the PCM or GCI highway bus, receive PCM or GCI highway data input pin (DRX) for receiving data from either the PCM or GCI highway bus, and frame sync input pin (FSYNC_bar) for providing a data framing signal that is used to indicate the start and stop of a communication/data frame.

Similarly, the control logic 1608 may have a number of external pins providing control and status information to and from the external controller, such as ring detect output pin (RGDT_bar) for producing an active low rectified version of the ring signal, ring ground output pin (RG_bar) for providing a control signal for ring ground relay, (may be used to support ground start applications), TIP ground detect input pin (TGD_bar) for detecting current flowing in TIP for supporting ground start applications, TIP ground detect enable output pin (TGDE_bar) for providing a control signal for the ground detect relay (may be used to support ground start applications), reset input pin (RESET_bar) for providing an active low input that may be used to reset all control registers to a defined initialized state (may also be used to bring powered side circuitry 116 out of sleep mode), and analog speaker output/interrupt output pin (AOUT/INT) for providing an analog output signal for driving a call progress speaker in AOUT mode (alternatively may be set to provide a hardware interrupt signal).

The telephone line side circuit 118, which may be implemented as an integrated circuit (IC), may communicate with the phone lines through hybrid, AC and DC termination circuitry 1617 (the DC termination circuitry also provides an internal power supply voltage), and determine ring-detect and off-hook status information through off-hook/ring-detect block 1620. In addition, the hybrid, AC and DC termination circuitry 1617 and the off-hook/ring-detect block 1620 are connected to the isolation interface 1614 so that control, status, signal and other desired information may be transmitted to and received from the powered side circuitry 116 across the isolation barrier 120.

In the embodiment depicted, the hybrid portion of hybrid, AC and DC termination circuitry 1617 has a receive input pin (RX) for providing the receive side input from the telephone network, an internal bias pin (IB) for providing a bias voltage to the device, a SC Connection pin (SC) for sensing a surge event and activating a clamp, DC termination pins (DCT, DCT2 and DCT3) for providing DC termination to the telephone network, a voltage regulator pin (VREG) for connecting to an external capacitor to provide bypassing for an internal power supply, and a voltage regulator 2 pin (VREG2) for connecting to an external capacitor to provide bypassing for an internal power supply.

The off-hook/ring-detect block 1620 may have external input pins allowing status information to be provided concerning phone line status information (RNG1, RNG2), such as ring and caller identification signals. For example, the first ring detect pin (RNG1) may connect to the TIP (T) lead 302 of the phone line through a resistor, and the second ring detect pin (RNG2) may connect to the ring (R) lead 304 of the phone line through a resistor. Further exemplary details on coupling a telephone line circuit to TIP and RING leads of a phone line may be found illustrated and described in U.S. patent application Ser. No. 10/397,960, entitled "DC HOLDING CIRCUIT" by Tim J. Dupuis et al., filed Mar. 26, 2003 now U.S. Pat. No. 6,968,055; and in copending U.S. patent application Ser. No. 10/400,183, entitled "FAST TRANSIENT FILTER AND FAST OFF-HOOK SETTLING NETWORK FOR A DC HOLDING CIRCUIT" Tim J. Dupuis et al., filed Mar. 26, 2003, the disclosures of which are incorporated herein by reference. In addition, off-hook/ring-detect block 1620 may have external transistor emitter output pins (QE, QE2) and transistor base pin (QB) that control external off-hook circuitry to enter, for example, an off-hook state or a limited power mode to get caller identification information. More particularly, the transistor emitter output pins (QE, QE2) may be connected to respective emitters of bipolar transistors within external hook-switch circuitry, and the transistor base output pin (QB) may be connected to a base of a bipolar transistor within external hook-switch circuitry.

In one embodiment, the digital information provided across the isolation barrier may include data bits, control bits and framing bits. Control bits may be utilized to provide control signals between the powered side circuitry 116 and the telephone line side circuitry 118. Framing bits may be provided to embed a framing format within the bit stream transmitted across the barrier. Framing bits may be utilized to frame the information provided across a barrier in order to provide sychnorization between the powered side circuitry 116 and the telephone line circuitry. Further information on embedding framing and control bits may be found in U.S. Pat. No. 6,408,034 and copending U.S. patent application Ser. No. 10/400,181, filed Mar. 26, 2003 and entitled "Self-Synchronized Data Scrambling For Transmission Across An Isolation Barrier" to Krone, the disclosures of which are incorporated herein by reference. In order to reduce transmission errors, a control bit may have to be received four times in a row before the control bit is recognized as described in the prior art techniques mentioned above. To also reduce transmission errors, information scrambling techniques may also be utilized with regard to the information provided across the isolation barrier. The scrambling techniques may include the techniques shown in U.S. Pat. No. 6,359,983 and copending U.S. patent application Ser. No. 10/400,181, filed Mar. 26, 2003 and entitled "Self-Synchronized Data Scrambling For Transmission Across An Isolation Barrier" to Krone, the disclosures of which are incorporated herein by reference.

According to the present invention, data bits provided across the isolation barrier may be subjected to error correction techniques to further reduce transmissions errors for information transmitted across the isolation barrier. Thus, the impact of EFTs may be minimized. In one exemplary embodiment, the isolation barrier may be a capacitive isolation barrier comprised of two capacitors. Further, the capacitive isolation barrier may be configured to transfer information in a differential, bidirectional mode of operation. However, the error correction techniques described herein are not limited to a particular type of telephone line isolation barrier. In one embodiment, the error correction techniques include providing each data bit multiple times across the isolation barrier. By providing the data bits multiple times across the isolation barrier, it is less likely that a single EFT event will corrupt the data. Error correction circuitry may than be utilized on the other side of the isolation barrier to compare the multiple transmissions of the data bit. An error corrected value of the data bit may then be provided.

An exemplary embodiment of the error correction techniques is described with reference to FIGS. 3 and 4. It will be recognized that FIGS. 3 and 4 provide illustrative embodiments and the techniques shown therein may be implemented in a wide range of manners.

In one embodiment, each data bit may be sent across the isolation barrier four times. More particularly, FIG. 3 shows a sample bit stream sequence for information transmitted across the isolation barrier. As shown in FIG. 3, bits may include framing bits (labeled F), control bits (labeled C) and data bits (labeled D). In general, a repetitive pattern of framing, control and data bits may be provided. As shown in FIG. 3, each framing or control bit may be followed by three data bits. The three data bits may be equally spaced apart bits of the data stream. For example, as shown in the first data group 302 of FIG. 3, the three data bits may be the Nth data bit, the data bit received A bits prior to the Nth data bit and the data bit received 2A data bits prior to the Nth data bit. In one example, A=8 such that the three data bits in the first data group of data bits are the $D_{N-16}$, $D_{N-8}$ and $D_N$ data bits. The pattern then may repeat with the next framing or control bit, followed by the data bits $D_{(N+1)-2A}$, $D_{(N+1)-A}$, and $D_{(N+1)}$ (where N+1 is the next data bit after the Nth data bit). As shown, this pattern may repeat indefinitely. To generate the desired data bit pattern on the transmission side of the isolation barrier, the current data bit may be provided and shift registers that captured the prior bits of the data stream may be utilized to provide the delayed data bits of the appropriate amount of delay (in the examples shown the previous data bits $D_{N-2A}$ and $D_{N-A}$). In this manner the three data bits $D_{N-2A}$, $D_{N-A}$, and $D_N$ may be provided for transmission together within one data group. In this manner, each data bit will eventually be transmitted across the isolation barrier three times (once as a current data bit $D_N$, once again as a $D_{N-A}$ data bit, and yet again as a $D_{N-2A}$ data bit). The techniques described herein are not limited, however, to transmitting each data bit three times and each data bit may be transmitted other numbers of times as desired by the user. In one embodiment, the transmission of each data bit three times provides a sufficient balance between the desired error correction and the system throughput.

Figure 3:
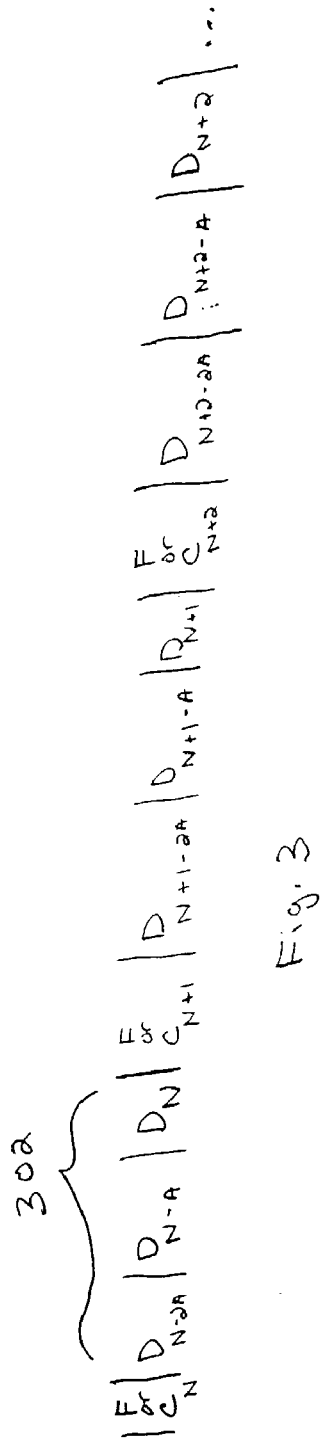
FIG. 3 illustrates an exemplary bit stream for communicating across an isolation barrier according to the disclosed systems and methods.
Figure 4:
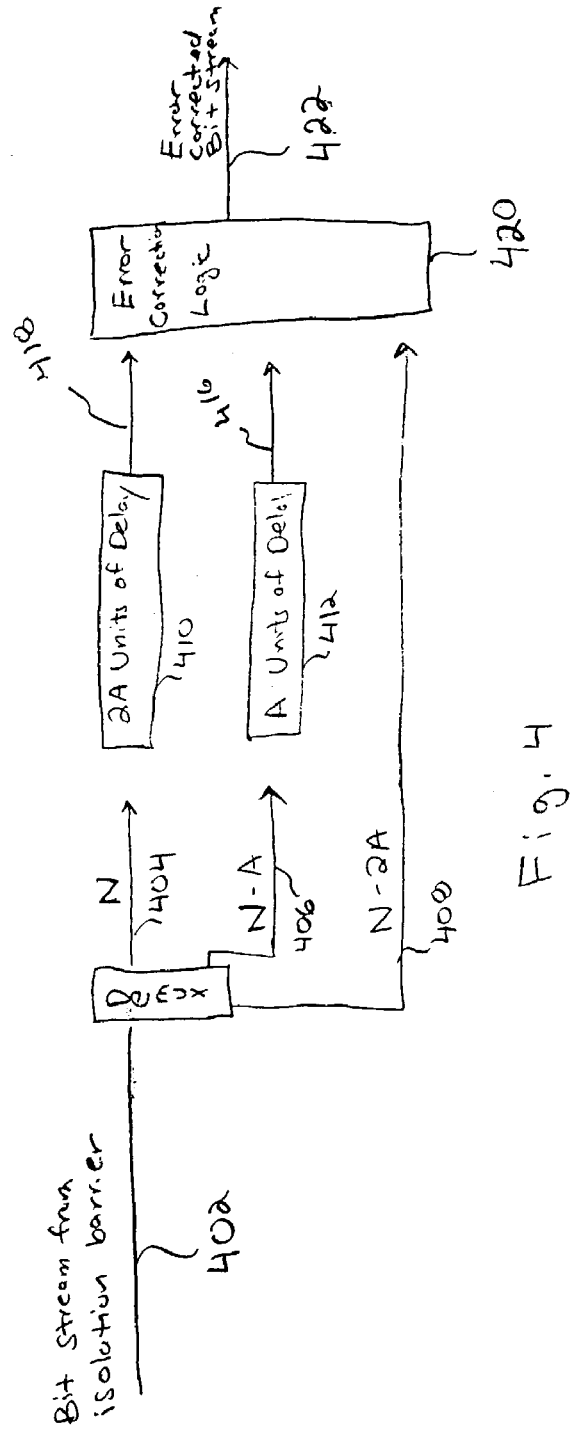
FIG. 4 illustrates an exemplary error correction circuit for correcting for errors in the bit stream of FIG. 3.
Figure 1:
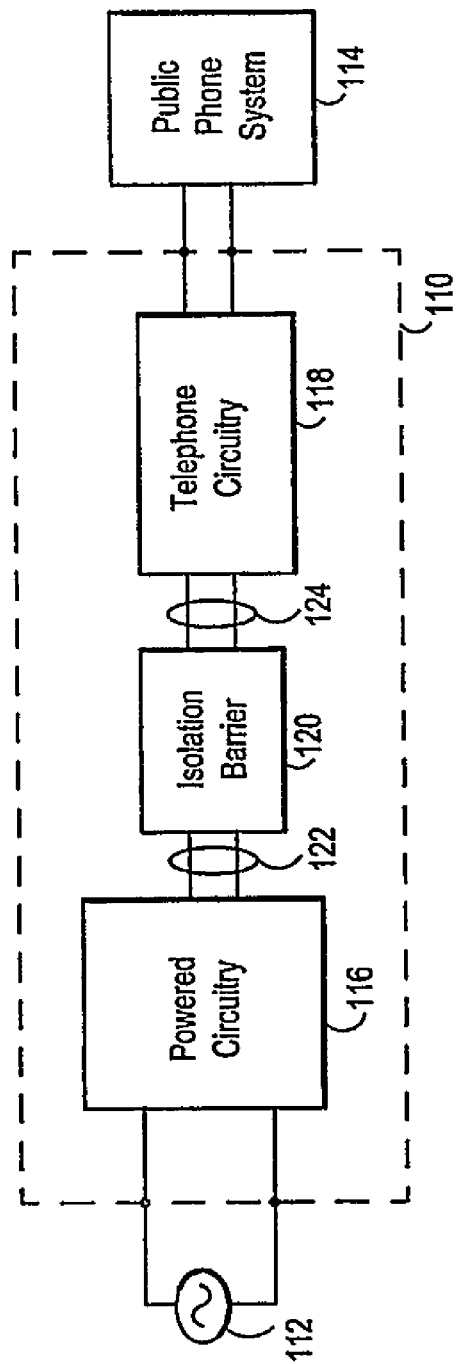
Figure 3:
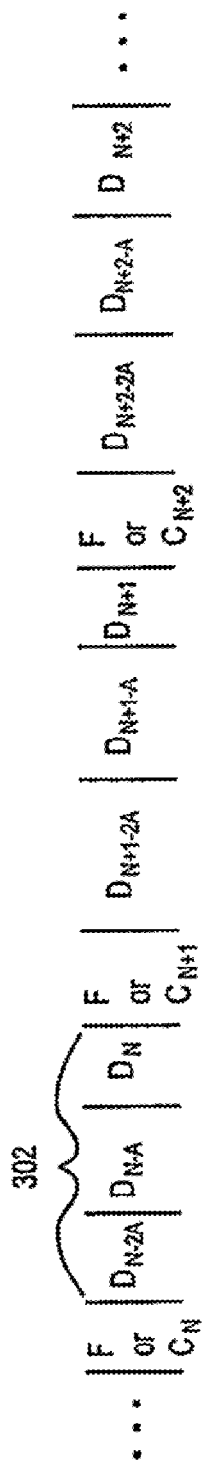
Figure 4:
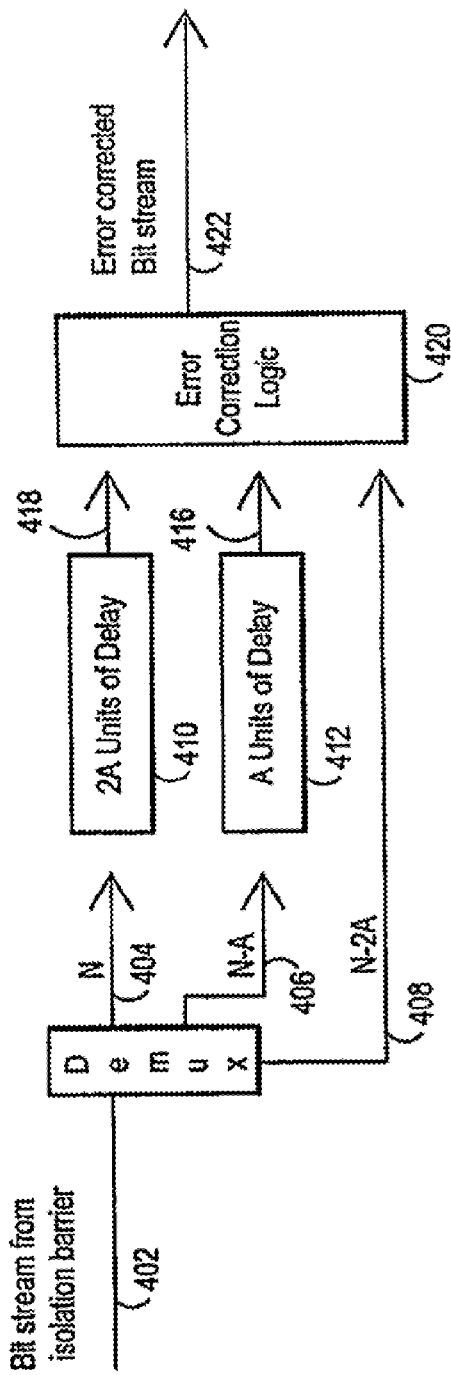

As shown in FIG. 3, each group of three data bits is followed by a framing or control bit, however, it will be recognized that other patterns of framing and control bits may be used. For example, a framing or control bit could alternatively be provided once for eight groups of three data bits or at some other selected frequency. The principles of providing error correction as described herein to the data bits may still be utilized, independent of the specific techniques for incorporating control and framing bits within the bit stream.

On the reception side of the isolation barrier, error correction techniques may be utilized to correlate the multiple transmissions of each data bit so as to provide an error corrected version of each data bit. In this manner, it is possible to correct bit errors that may occur, such as bit errors that result from EFTs. FIG. 4, illustrates one embodiment of the error correction techniques that may be utilized on the reception side of the isolation barrier. The embodiment shown in FIG. 4 demonstrates these techniques with reference to a system in which each data bit is transmitted across the isolation barrier three times. As mentioned above, however, the techniques of the present invention are not only limited to approaches that utilize three transmissions of each data bit.

As shown in FIG. 4, a digital bit stream 402 is received from across an isolation barrier. In the example shown, the bit stream may take the form of the bit stream shown in FIG. 3. The bit stream 402 may then be demultiplexed in order to separate the data bits of one data group of data bits, such as each data bit $D_{N-2A}$, $D_{N-A}$, and $D_N$ of data group 302 of FIG. 3 (though not shown, control bits and framing bits may also be demultiplexed and provided to appropriate control and framing circuitry). As shown in FIG. 4, the current data bit, $D_N$, of each data group of data bits may be provided on line 404, the data bit that is delayed by a factor of A, $D_{N-A}$, is provided on line 406 and the data bit that is delayed by a factor of A, $D_{N-2A}$, is provided on line 408. The data bits on line 404 are then provided to a delay block 410 which provides 2A units of delay, the data bits on line 406 are then provided to a delay block 412 which provides A units of delay and the data bits on line 408 are not delayed. The delay blocks may be comprised of shift registers such as shift registers formed from flip-flops. However, other delay blocks may also be utilized. The output of delay block 410 is provided on line 418 to an error correction logic circuit 420, the output of delay block 412 is provided on line 416 to error correction logic circuit 420 and the data bit on line 408 is also provided to the error correction logic 420.

The amount of delay provided in delay blocks 410 and 412 is selected to correspond to the amount of delay between each data bit of a data group. Thus, as a bit stream such as the bit stream of FIG. 3 cycles through the circuitry of FIG. 4, if no errors are introduced into the data stream then the digital data on lines 418, 416 and 408 that is presented to error correction logic should have the same value at any give time. In such a case, the error correction logic would note that all three digital inputs are the same value and provide that digital value as the error corrected data bit on line 422 for further processing by the DAA circuitry.

The bit stream techniques and circuitry of FIG. 4 still allow for a correct error corrected data bit even if a bit error in the stream occurs during transmission across the isolation barrier. More particularly, if a single bit error was introduced into the bit stream, for example as may be caused by an EFT event, then at least two of the three inputs provided to the error correction logic would still have the same value. For example, if a bit was corrupted when first transmitted across the barrier (for example when transmitted as a $D_N$ data bit), the data on line 418 may be corrupted but the re-transmissions of that bit that would be present on lines 416 and 408 would not be corrupted. Thus, the error correction logic may be configured to compare the three inputs and determine what digital value corresponds to two or more of the inputs. This digital value may then be provided as an output on line 422 as part of the error corrected bit stream. In this manner, error correction is provided such that if a bit error occurs (such as from an EFT event), the use of multiple transmissions of each data bit across the isolation barrier allows for the proper data bit value to be provided as part of the error corrected bit stream 422.

In one embodiment, the bit period for each bit may be approximately 122 nsec. such that the combination of a framing or control bit and a data group of three data bits may be transmitted in a total of approximately 488 nsec. Further, with A=8, a given data bit may be repeated every eight data groups. Thus, the time between the retransmission of a given data bit is approximately 4 μsec. Because an EFT event may generally have a corrupting influence over a period of approximately 1–2 μsec, it is unlikely that an EFT will corrupt more than one bit of the three bit transmissions provided for each data bit. In this manner a robust mechanism to correct for errors caused by EFTs is provided. It will be recognized, however, that as A increases in value the circuitry to implement the techniques provided herein and the latency will also increase. Thus it is desirable to balance these factors in selecting a value for A.

In one embodiment, the bit stream may be formed from data that is provided from a delta-sigma modulator. The data may be encoded (such as with framing and control bits) and further scrambled, for example as shown in copending U.S. patent application Ser. No. 10/400,181, filed Mar. 26, 2003 and entitled "Self-Synchronized Data Scrambling For Transmission Across An Isolation Barrier" to Krone, the disclosure of which is incorporated herein by reference. Further, the techniques described herein may be utilized for bit streams being transmitted in both directions across an isolation barrier. Thus, data transmitted from powered side circuitry 116 to telephone line circuitry 118 may be transmitted in a bit stream such as shown in FIG. 3 and an error correction technique such as shown in FIG. 4 may be utilized in the telephone line circuitry 118. Similarly, data transmitted from telephone line circuitry 118 to powered side circuitry 116 may be transmitted in a bit stream such as shown in FIG. 3 and an error correction technique such as shown in FIG. 4 may be utilized in the powered side circuitry 116.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the type, size and arrangement of parts. For example, equivalent elements may be substituted for those illustrated and described herein, and certain features of the invention may be utilized independently of the use of other features, all as would be apparent to one skilled in the art after having the benefit of this description of the invention. Moreover, the various aspects of the inventions disclosed herein may be used in combination or separately as will also be apparent to those skilled in the art.

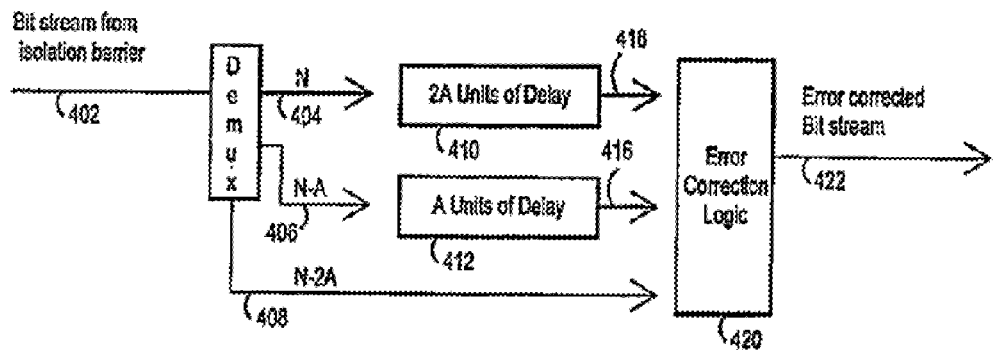

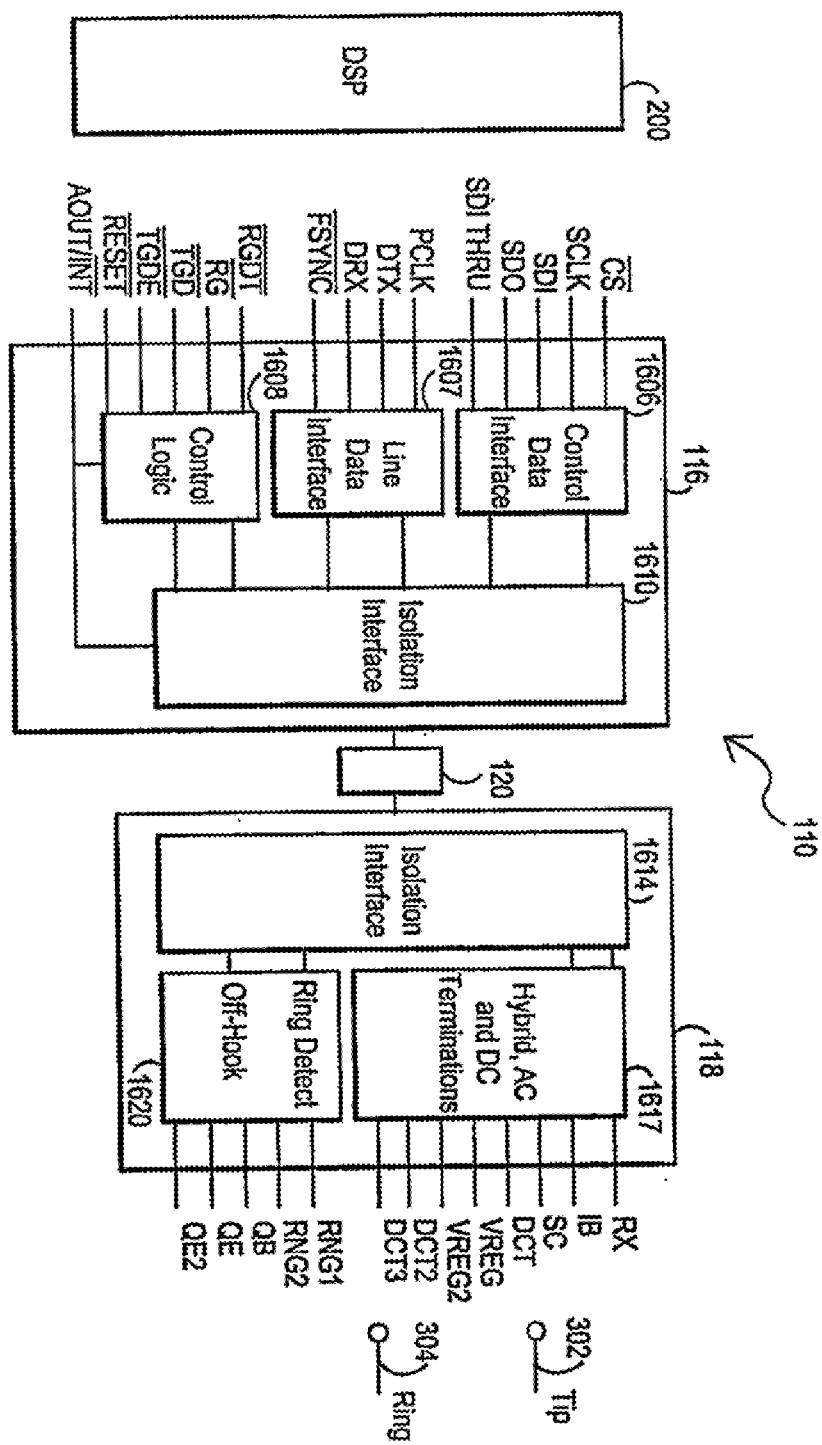

What is claimed is:

1. A method of providing a phone line communication system, comprising:
    providing powered circuitry and phone line side circuitry, the phone line side circuitry configured to be coupled to a phone line, the powered circuitry and phone line side circuitry configured to allow communication between the powered circuitry and the phone line side circuitry across an isolation barrier;
    configuring at least one of the powered circuitry or the phone line side circuitry to generate a serial digital bit stream, the serial digital bit stream including at least data bits;
    configuring at least one of the powered circuitry or the phone line side circuitry to transmit a plurality of the data bits across the isolation barrier as part of the serial digital bit stream, at least some individual data bits of the plurality of the data bits being provided to be transmitted multiple times across the isolation barrier;
    configuring at least one of the powered circuitry or the phone line side circuitry to receive the serial digital bit stream, the receiving circuitry including error correction circuitry;
    configuring the error correction circuitry to receive the individual data bits that are provided to be transmitted multiple times;
    analyzing the multiple transmissions of the individual data bits to detect the presence of an error; and
    generating an error corrected version of the individual data bits if an error is detected.

2. The method of claim 1 wherein the isolation barrier comprises capacitors.

3. The method of claim 1 wherein each individual data bit is transmitted at least three times across the isolation barrier.

4. The method of claim 1 wherein the time spacing between the multiple transmissions of individual data bits is sufficient such that a single EFT event will be unlikely to effect more than one transmission of a given individual data bit.

5. The method of claim 4, wherein the multiple transmissions of an individual data bit are spaced such that at least eight other data bits are provided before the individual data bit is retransmitted.

6. The method of claim 5 wherein each individual data bit is transmitted at least three times across the isolation barrier.

7. The method of claim 6 wherein the error corrected version of the individual data bits is selected to be the value that corresponds to the value of a majority of the multiple transmissions of the individual data bit.

8. The method of claim 1 wherein the phone line side circuitry and the powered side circuitry are both configured to both transmit and receive multiple transmissions of individual data bits.

9. A method of correcting data in a communication system, comprising:
    providing first circuitry that is capable of being located on a first side of an isolation barrier, the first circuitry being either phone line side circuitry configured for coupling to phone lines or powered side circuitry configured for coupling to a power source;
    providing second circuitry that is capable of being located on a second side of an isolation barrier, the second circuitry being the other of the either phone line side circuitry or powered side circuitry;
    providing a digital data stream within the first circuitry, the digital data stream to be provided from the first circuitry for transmission across the isolation barrier, the digital data stream comprising a plurality of data bits;
    transmitting individual data bits of the plurality of data bits multiple times across the isolation barrier;
    receiving the multiple transmissions of the individual data bits in the second circuitry; and
    utilizing the multiple received transmissions of the individual data bits to detect an error; and
    performing error correction in the second circuitry to provide an error corrected version of the individual data bits when the error is detected.

10. The method of claim 9 wherein the isolation barrier comprises capacitors.

11. The method of claim 10 wherein each individual data bit is transmitted at least three times across the isolation barrier.

12. The method of claim 11 wherein the time spacing between the multiple transmissions of individual data bits is sufficient such that a single EFT event will be unlikely to effect more than one transmission of a given individual data bit.

13. The method of claim 10 wherein the time spacing between the multiple transmissions of individual data bits is sufficient such that a single EFT event will be unlikely to effect more than one transmission of a given individual data bit.

14. The method of claim 10, wherein the multiple transmissions of an individual data bit are spaced such that at least eight other data bits are provided before the individual data bit is retransmitted.

15. The method of claim 14 wherein each individual data bit is transmitted at least three times across the isolation barrier.

16. The method of claim 15 wherein the error corrected version of the individual data bits is selected to be the value that corresponds to the value of two or more of the multiple transmissions of the individual data bit.

17. The method of claim 16 wherein the phone line side circuitry and the powered side circuitry are both configured to both transmit and receive multiple transmissions of individual data bits.

18. Circuitry configured for use in a phone line communication system, comprising:

powered side circuitry and phone line side circuitry configured to communicate with each other across an isolation barrier;

a digital bit stream within at least one of the powered side circuitry or the phone line side circuitry, the digital bit stream including at least digital data bits, the digital data bits comprising a series of individual data bits, at least some of the individual data bits repeated in the data stream to allow multiple transmissions of an individual data bit across the isolation barrier;

error correction circuitry within at least one of the powered side circuitry or the phone line side circuitry, the error correction circuitry receiving the multiple transmissions of individual data bits at an input, analyzing the multiple transmission to detect the presence of an error and providing at an output error corrected data bits when the error is detected.

19. The circuitry of claim 18 wherein the isolation barrier comprises capacitors.

20. The circuitry of claim 18 wherein each individual data bit is transmitted at least three times across the isolation barrier.

21. The circuitry of claim 20 wherein the time spacing between the multiple transmissions of individual data bits is sufficient such that a single EFT event will be unlikely to effect more than one transmission of a given individual data bit.

22. The circuitry of claim 21 wherein an individual data bit $D_N$ is retransmitted at at least intervals of N+A and N+2A, wherein A is a determined number of bits later in time.

23. The circuitry of claim 22 wherein A=8.

24. The circuitry of claim 22 wherein the error correction circuitry is comprised of shift registers including at least delays of A and 2A.

* * * * *

UNITED STATES PATENT AND TRADEMARK OFFICE
CERTIFICATE OF CORRECTION

PATENT NO.         : 7,089,475 B1
APPLICATION NO.    : 10/400182
DATED              : August 8, 2006
INVENTOR(S)        : Andrew W. Krone It is certified that error appears in the above-identified patent and that said Letters Patent is hereby corrected as shown below:

The Title Page, showing an illustrative figure, should be deleted and substitute therefor the attach tile page.

Delete drawings sheets 1-2 and substitute therefor the drawing sheets, consisting of fig. 1-7 as shown on the attached page.

Signed and Sealed this

Sixth Day of March, 2007

JON W. DUDAS
*Director of the United States Patent and Trademark Office*

United States Patent
Krone et al.

(10) Patent No.: US 7,089,475 B1
(45) Date of Patent: Aug. 8, 2006

(54) ERROR CORRECTION OF DATA ACROSS AN ISOLATION BARRIER

(75) Inventors: Andrew W. Krone, Austin, TX (US); Mitchell Reid, Austin, TX (US)

(73) Assignee: Silicon Laboratories Inc., Austin, TX (US)

(*) Notice: Subject to any disclaimer, the term of this patent is extended or adjusted under 35 U.S.C. 154(b) by 446 days.

(21) Appl. No.: 10/400,182

(22) Filed: Mar. 26, 2003

(51) Int. Cl.
G06F 11/00 (2006.01)
H04B 1/38 (2006.01)

(52) U.S. Cl. .................. 714/746; 375/220
(58) Field of Classification Search .......... 714/746; 375/222, 257; 379/73.05; 365/232
See application file for complete search history.

(56) References Cited

U.S. PATENT DOCUMENTS

| | | |
|---|---|---|
| 4,475,208 A | 10/1984 | Ricketts |
| 4,541,104 A | 9/1985 | Hirosaki |
| 4,620,309 A | 10/1986 | Ogawa |
| 5,051,799 A | 9/1991 | Paul et al. |
| 5,136,587 A | 8/1992 | Obana et al. |
| 5,506,903 A | 4/1996 | Yamashita |
| 5,561,712 A | 10/1996 | Nishihara |
| 5,654,984 A | 8/1997 | Hershbarger et al. |
| 5,705,978 A | 1/1998 | Frick et al. |
| 5,740,241 A | 4/1998 | Koenig et al. |
| 5,867,489 A | 2/1999 | Hershey et al. |
| 5,870,046 A | 2/1999 | Scott et al. |
| 6,072,778 A | 6/2000 | Labedz et al. |
| 6,137,827 A | 10/2000 | Scott et al. |
| 6,144,326 A | 11/2000 | Krone et al. |
| 6,160,885 A | 12/2000 | Scott et al. |
| 6,157,134 A | 12/2000 | Scott et al. |
| 6,198,816 B1 | 3/2001 | Hein et al. |
| 6,298,133 B1 | 10/2001 | Hein et al. |
| 6,351,530 B1 * | 2/2002 | Rahamim et al. ...... 379/399.01 |
| 6,359,983 B1 | 3/2002 | Krone et al. |
| 6,385,235 B1 | 5/2002 | Scott et al. |
| 6,389,134 B1 | 5/2002 | Dupuis et al. |
| 6,408,034 B1 | 6/2002 | Krone et al. |
| 6,430,229 B1 | 8/2002 | Scott et al. |
| 6,480,602 B1 | 11/2002 | Dupuis et al. |
| 2003/0179818 A1 * | 9/2003 | D'Angelo et al. ...... 375/222 |
| 2004/0100854 A1 * | 5/2004 | Rahamim et al. ...... 365/232 |

OTHER PUBLICATIONS

Silicon Laboratories Data Sheet Si3034, "3.3 V Global Direct Access Arrangement," Rev. 2.01 Sep. 2001, Si3034-DS201, pp. 1-66.

* cited by examiner

Primary Examiner—Phung My Chung
(74) Attorney, Agent, or Firm—O'Keefe, Egan & Peterman, LLP

(57) ABSTRACT

A communication isolation system is provided that may employ error correction techniques for the data communicated across an isolation barrier used for connecting electronic circuitry to a communication line. In one embodiment, each data bit to be transmitted to or from the phone line may be transmitted three times across an isolation barrier so that it is possible to withstand a single electronic fast transient event. In another embodiment, the isolation barrier may be a capacitive isolation barrier. In another embodiment, the three transmissions of the data bit may be received across the isolation barrier and delay elements utilized to provide the data bits to a logic circuit in a synchronized fashion so that the three data bits may be compared to determine the error corrected data.

24 Claims, 3 Drawing Sheets